United States Patent [19]
Burbank et al.

[11] Patent Number: 5,583,394
[45] Date of Patent: Dec. 10, 1996

[54] ELECTROLUMINESCENT LAMP WITH REGISTRATION INDEX FEATURE AND METHOD OF MAKING THE SAME

[75] Inventors: Robert M. Burbank, Lebanon, N.H.; Jason T. Throne, Broomfield, Colo.

[73] Assignee: Astronics Corporation, Inc., Buffalo, N.Y.

[21] Appl. No.: 448,145

[22] Filed: May 23, 1995

[51] Int. Cl.$^6$ .............................. H01J 1/62; H01J 63/04
[52] U.S. Cl. ........................... 313/498; 313/512; 428/917
[58] Field of Search .................................... 313/471, 498, 313/504, 506, 509, 511, 512; 428/913, 917; 445/3, 64

[56] References Cited

U.S. PATENT DOCUMENTS

| | | |
|---|---|---|
| 3,395,058 | 7/1968 | Kennedy . |
| 4,104,555 | 8/1978 | Fleming ................................. 313/512 |
| 4,687,968 | 7/1987 | Frayer ................................... 313/509 |
| 5,051,654 | 9/1991 | Nativi et al. . |
| 5,107,408 | 4/1992 | Vernondier . |
| 5,309,060 | 5/1994 | Sharpless et al. ..................... 313/511 |

FOREIGN PATENT DOCUMENTS

0545558A1  9/1993  European Pat. Off. .

*Primary Examiner*—Sandra L. O'Shea
*Assistant Examiner*—Mack Haynes
*Attorney, Agent, or Firm*—Steven J. Hultquist

[57] ABSTRACT

An electroluminescent lamp having an indexing indicium, e.g., a registration mark, located within the lit surface area of the lamp, with the registration mark preferably being transparent to the illumination generated by the lamp when the lamp is lit in use, but being readily detected when selectively activated for providing an alignment point or region on the lamp, such as by activation with ultraviolet light of specific frequency/wavelength characteristics, when the registration mark is formed by deposition on the lamp lit surface of a dot or blob of a composition containing an ultraviolet radiation-fluorescent printing ink.

18 Claims, 2 Drawing Sheets

ELECTROLUMINESCENT LAMP WITH REGISTRATION INDEX FEATURE AND METHOD OF MAKING THE SAME

BACKGROUND OF THE INVENTION

1. Field of the Invention

The present invention relates to an electroluminescent (EL) lamp having indexation indicium thereon, and to an appertaining method of manufacture of an electroluminescent lamp wherein the registration of component layers and elements of the lamp is readily effected via utilization of such indexation indicia.

2. Description of the Related Art

Electroluminescent lamps are extensively used as illumination sources in a wide variety of applications and products, including primary, emergency and auxilliary lighting systems in land-based vehicles, building structures, aircraft, marine craft, and outdoor locations.

Structurally, electroluminescent lamps typically comprise a layer of electroluminescent phosphor material, such as a metal activated zinc sulfide, which is fixed by a polymer binder between two conductive layers, one of which is transparent. When an alternating electric field is applied across the conductors, the electroluminescent phosphors are excited and emit photons, with almost all of the radiated energy lying within the visible light spectrum. The emission spectrum and wavelength generated by the electroluminescent phosphors are controlled by an activator, such as copper or manganese.

Electroluminescent phosphors are inherently hygroscopic in character. Exposure to excess heat and moisture will damage the electroluminescent phosphor particles. This sensitivity to heat and moisture is so strong that exposure to even low humidity conditions will adversely affect the illumination efficiency and decrease the light output capacity of a lamp in which such exposed electroluminescent phosphors are incorporated.

A number of different methods have been used in order to reduce the exposure of the electroluminescent phosphor particles to these detrimental effects. One such method attempts to encapsulate each individual electroluminescent phosphor particle. Although this approach has had limited success, the EL industry has been slow to adopt same.

The most common method of moisture protection of electroluminescent phosphor particles is packaging the lamp structure that contains the electroluminescent phosphors, in a transparent, moisture impenetrable polymer material. Polychlorotrifluoroethylene (PCTFE) copolymers are the most moisture-impenetrable, transparent polymers known. They have moisture vapor transmission rates that are an order of magnitude below all other transparent polymers. While the use of a PCTFE film provides the best moisture protection and subsequently the longest life electroluminescent lamps, it also significantly complicates the lamp manufacturing process.

In the manufacture of electroluminescent lamps, the typical lamp has an aluminum foil substrate which is coated with an insulating layer of high dielectric constant material, such as a high dielectric resin loaded with barium titanate, and is subsequently coated with a high dielectric resin loaded with electroluminescent phosphor.

The resulting electroluminescent phosphor coated foil is screen printed with a transparent electrode layer, using a transparent conductive coating. Next, a narrow conductive busbar is formed using a silver-loaded ink that is screen printed onto the transparent electrode, so that the busbar subsequently may be used to efficiently transfer current to all points of the transparent electrode layer.

A desiccant layer then is applied over the electrode and busbar. The desiccant can either be pattern printed as described in U.S. Pat. No. 5,051,654, the disclosure of which is hereby incorporated herein by reference in its entirety, or else the desiccant can be laminated to the electrode layer. This coated foil assembly is next cut to a prescribed shape using appropriate cutting/shaping tools, such as a shear cutter, a die cutter, or a router.

The resulting cut assembly must have electrical leads placed onto it to transfer current from outside the final package to the electrodes of the lamp assembly. The leads are hand placed into position. To manually place leads when the desiccant is laminated to the transparent electrode, the edge of the desiccant must be pulled back, an insulating tape must be put over the edge of the foil where the front lead will be placed, the front lead must be positioned onto the busbar, and the desiccant must be resealed in place. These fabrication steps are all done by hand.

If the desiccant is screen printed, an edge tape must be placed over the edge of the lamp and the lead must be hand- or machine-positioned on the busbar. After lead placement is complete, the lamp must be packaged and dried.

Regardless of whether the desiccant is screen printed or laminated, the fabrication steps are extremely labor intensive and time consuming. An efficient automated process therefore would significantly reduce labor costs for the lamp manufacturing process, permitting a much more economic electroluminescent lamp product to be produced, as well as achieving a vast increase in the production rate of the electroluminescent lamps, since the manual process steps involved in current fabrication methods greatly restrict the product output of the lamp manufacturing facility.

To subsequently package an electroluminescent lamp in PCTFE, small pieces of pressure-sensitive two-sided tape are placed on the back of the lamp, then the lamp is stuck to the back package material, a PCTFE film. The front package material is positioned over the front of the lamp and then heat tacked to the back package material, thereby sandwiching the lamp assembly between the front and back package layers.

When the lamp is finally "laid up," in the above-described manner, it is allowed to dry in a low humidity room. Once dry, the lamp is heat- and pressure-sealed in the final sealed assembly which has been cut to create the finished lamp. The final cutting operation requires hand alignment or extensive programming on a CNC router. This final cutting step also is very labor- and time-intensive.

Thus, the conventional prior art method of manufacturing electroluminescent lamps is labor intensive and time-consuming, requiring much inherently slow hand manipulation of the parts that comprise the final product. The hand processing steps involved in electroluminescent lamp manufacture, which result in low manufacturing efficiency, are not amenable to automated production due to the lack of suitable guide means for the processing of electroluminescent lamp assembly during its fabrication.

As a result, a great deal of time, effort, and resources have been expended in efforts to improve the electroluminescent lamp manufacturing process. For nearly thirty years, there have been repeated efforts to efficiently automate and improve the manufacture of electroluminescent lamps. During this period of time, some manufacturing solutions have been found which improve the processing per se of electroluminescent lamps, but always at the expense of lamp quality.

In one approach proposed by the prior art, the electroluminescent lamp is completely printed, i.e., all the layers of the lamp are printed onto a stable polymeric substrate which functions as the back package of the lamp. The resulting printed structure then is laminated to the front package and cut in reference to visible registration marks that are located on the surface of the laminated structure, but outside the dimensions of the final cut of the lamp.

The resulting electroluminescent lamp is characterized by extremely poor service life, because the package materials do not have effective water vapor impermeability properties. As mentioned earlier herein, PCTFE copolymers are the most moisture-impenetrable, transparent polymers known, with very low moisture vapor transmission rates. However, PCTFE film cannot be used in an "all-printed" lamp process, because the surface energy of the PCTFE film is too low to print on and because the PCTFE material is unstable and shrinks at the elevated temperature levels used to dry the various inks used in the all-printed electroluminescent lamp.

For these reasons, the all-printed electroluminescent lamp typically uses polyethylene terephthalate (PET) film as its substrate. While PET film is stable and can be made printable in character, such film nonetheless has water vapor transmission properties orders of magnitude worse than PCTFE film. A direct correlation exists between lamp life and the amount of water vapor and atmospheric gases that reach the phosphor layer while the lamp is charged. The more atmospheric moisture permeates into the interior portions of the electroluminescent lamp, the lower is the service life of the electroluminescent lamp. Thus, conventional all-printed electroluminescent lamps using PET film as its packaging material, is characterized by extremely short lamp life and poor quality.

In efforts to improve on the all-printed electroluminescent lamp manufacturing process, attempts have been made to encapsulate the individual phosphor particles, to provide improved moisture and gas protection of the active illuminating material. These attempts, however, have been relatively unsuccessful.

Although the use of encapsulated phosphors does improve electroluminescent lamp life in comparison to corresponding electroluminescent lamps fabricated with nonencapsulated phosphors, an electroluminescent lamp containing encapsulated phosphors and sealed in PET film generally has a shorter service life than a corresponding electroluminescent lamp containing nonencapsulated phosphors and sealed in a PCTFE film.

Thus, while some measurable improvement is afforded by an encapsulated phosphor particle construction in enhancing the moisture-resistance of the phosphors, such enhancement of moisture-resistance is not enough to improve the service life of the all-printed electroluminescent lamp when compared with the service life of a typical electroluminescent lamp sealed in a PCTFE film. Further, the encapsulation of the phosphor particles increases the complexity and cost of the resulting electroluminescent lamp product.

Each of the foil, electrode, dielectric, phosphor, busbar, desiccant, etc. layers in the electroluminescent lamp construction may constitute a lamina for a single lamp article, so that one product lamp article is formed from a single laminate assembly of multiple laminae.

Alternatively, each of such constituent layers may be of an extended sheet conformation, and have a multiplicity or array of appertaining lamp-forming regions thereon of the desired character, so that a number of discrete lamp articles may be formed from the stacked laminate comprising the respective sheets. Such methodology may be particularly advantageous in an all-printed lamp manufacture, since the individual sheets can be each printed across the full surface of the sheet, so that the final assembled laminate has discrete surface areas constituting individual lamp articles, which then can be cut from the assembled laminate, to yield the lamp articles for further processing and packaging.

Regardless of the specific method of manufacture described above, a lamp article, comprising the electroluminescent phosphor coated foil, transparent electrode layer, transparent conductive coating, conductive busbar, and desiccant layer, must subsequently be cut to a prescribed shape using cutting/shaping tools. In such cutting/shaping operation, the registration of the cutting means is critical, since any misalignment of the cutter, in relation to the sucessively layered elements in the laminated lamp assembly, can lead to the cutter severing the individual lamp article inside its intended marginal edges, thereby rendering the lamp article useless for its intended purpose and necessitating its rejection in the manufacturing process.

The registration problems discussed above have proven especially intractable. Although the prior art has provided registration marks at the margins of the film stock or layers from which the laminated lamp article is cut, such marks reside outside of the lit area of the lamp. Accordingly, once the lamp is cut and separated from the scrap containing the registration mark-containing margin, the lamp thereafter lacks any associated registration indicia which would serve as an alignment guide in the further processing of the lamp. The further processing steps, involving heat and pressure sealing and packaging of the lamp, followed by the final (finishing) cutting of the lamp product article, require close alignment of the lamp with the processing equipment, and any mis-registration may impair or even fully ruin the product article, as noted hereinabove.

These registration problems have not been satisfactorily resolved by the art, and in practice the rate of rejection of mis-registered product articles is unacceptably high.

Thus, the fact is that the lack of any reliable means or method of aligning the electroluminescent lamp assembly in its final packaging and cutting steps, so that the illuminated or lit area of the lamp (such "illuminated or lit area" being the phosphorluminescent region of the laminated assembly, i.e., the light-producing portion containing the phosphor material)is appropriately positioned inside the intended margins of the lamp article, has posed a continuing impediment to the efficient high volume commercial manufacture of electroluminescent lamp articles.

It would therefore be a significant advance in the art, and is accordingly an object of the present invention, to provide an electroluminescent lamp construction and method of manufacture which overcomes the aforementioned deficiencies of the prior art.

Other objects and advantages of the present invention will more fully apparent from the ensuing disclosure and appended claims.

SUMMARY OF THE INVENTION

The present invention relates to an electroluminescent lamp having an indexation indicium within the lit area of the lamp, and to an appertaining method of manufacture of an electroluminescent lamp wherein the registration of component layers and elements of the lamp is readily effected via utilization of such indexation indicia.

The indexing indicium of the electroluminescent lamp of the present invention is within the lit area of the lamp, but is constructed and arranged so that it does not adversely affect the uniformity of the illumination supplied by the electroluminescent lamp in use. The indexing indicium may be of various types, and is formed so as to be selectively detectable in the subsequent processing (packaging, sealing and final cutting) steps to which the lamp article is subjected in the course of its final fabrication into a packaged electroluminescent lamp product. Such subsequent detectibility may for example be effected by making the indexing indicium visible under a selected type of radiation (fluorescent light, uv radiation, infrared radiation, etc.), by making the indexing indicium sensitive to, and detectible by, application of a magnetic field, or in any other suitable manner.

The present invention in one specific aspect relates to an electroluminescent lamp including an electroluminescent material defining a lit area of the lamp when an excitatory electrical field is applied to the electroluminescent material, and having an indexing indicium, e.g., a registration mark, located in the lit area of the lamp, wherein the indexing indicium is non-apparent in visible light, but is detectable when exposed to a detection condition (which may for example comprise impingement on the indexing indicium of a flux of specific radiation (other than visible light) or magnetic field application to the indexing indicuium).

The indexing indicium may thererfore comprise a surface artifact on the lit surface of the lamp article which is responsive to an applied stimulus, and thus furnishes a sensible physical response (to such response) that demarcates the position of the indexing artifact. Alternatively, the indexing indicium may comprise an applied coating which differentially responds under the applied stimulus defining the aforementioned detection condition.

The indexing indicium can be applied to the lamp in a number of ways, depending on the nature of the indicium and the desired detection condition. The preferred method is screen printing a registration mark onto the lit surface of the lamp. An alternative method involves creating a negative image around an indexation mark, so that the mark would not be activated per se, but the surrounding surface of the lamp would be activated by specific wavelenths of invisible radiation, e.g., infrared radiation, so that the contrast between the mark and the activated surface would define the registration feature.

In another aspect, the electroluminescent lamp of the present invention comprises an electrode overlying a phosphor layer, with a very narrow slit in the electrode that exposes the phosphor layer so that the phosphor layer fluoresces when it is exposed to ultraviolet light. Dimensionally, the slit must be sufficiently narrow so the electrode has enough "edge effect" to charge the exposed phosphor when the electrode is energized with electrical energy under normal operating conditions, so that the exposed phosphor resultingly emits light.

The present invention in another aspect relates to an electroluminescent lamp including an electroluminescent material defining a lit area of the lamp when an excitatory electrical field is applied to the electroluminescent material, and having an indexing indicium, e.g., a registration mark, located in the lit area of the lamp, wherein the indexing indicium is defined by a magnetic field which is detectable by a magnetic induction detector.

In a method aspect, the invention relates to the fabrication of an electroluminescent lamp with an indexing indicium of any suitable type, wherein the indexing indicium is located within the lit area of the electroluminescent lamp.

As used herein, the term "indexing indicium" means any mark, feature, asperity, condition, conformation, structure or state of a specific location within the lit area of the electroluminescent lamp, which is selectively definable and perceptible (I) under conditions other than the normal (illumination-producing) operating conditions of the electroluminescent lamp, and/or (ii) with a detection system, e.g., a device, kit, machine, or the like.

Other aspects and features of the present invention will be more fully apparent from the ensuing disclosure and appended claims.

DETAILED DESCRIPTION OF THE INVENTION, AND PREFERRED EMBODIMENTS THEREOF

The provision of an indexing indicium in accordance with the present invention, such as a registration mark or other perceivable indexing feature (either directly perceivable by human physical senses, e.g., visually perceptible, or indirectly perceivable by or with the aid of a machine, device, process or composition), on the lit area of an electroluminescent lamp, in which the indexing indicium does not adversely affect lamp quality, provides a striking and substantial manufacturing improvement over the prior art.

With the indexing feature of the present invention, the many steps required to manufacture a high quality electroluminescent lamp can be automated, thus significantly reducing labor costs. Equally important, an automated system increases production speed and product reproducibility, so that the high reject rates which have been experienced in the prior art manufacturing of electroluminescent lamps are eliminated in the practice of the present invention. The advantages of the indexing feature of the present invention not only encompass the manufacturing of the electroluminescent lamp, but also extend to the end use of the product lamp article, e.g., the indexing feature may be employed to align the electroluminescent lamp product in a fixture or housing for subsequent operational use.

Figure 1:
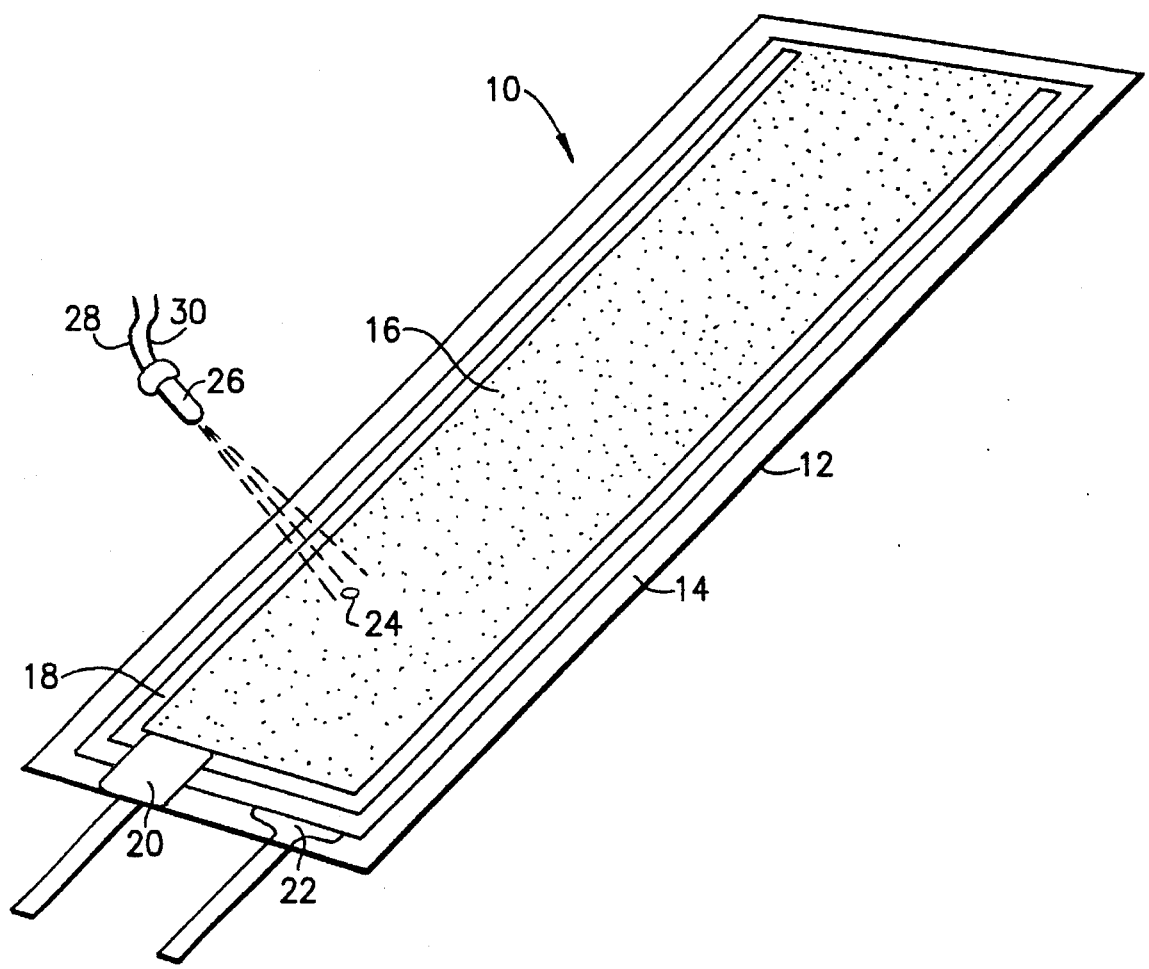
FIG. 1 is a front perspective view of an electroluminescent lamp formed in accordance with the present invention.

Referring now to FIG. 1, an electroluminescent lamp 10 according to one embodiment of the present invention is shown in its activated state. As used herein, the term "activated state" means the state in which the indexing indicium (registration mark 24 in the FIG. 1 electroluminescent lamp) can be detected by suitable means, method or perception.

The electroluminescent lamp 10 shown in perspective view in FIG. 1 comprises a laminated structure comprising a series of laminae or layers as hereinafter more fully described, defining a composite article structure including a central lit area 16 and a marginal or peripheral non-lit area 14. The composite stack assembly of layers making up the electroluminescent lamp 10 include a bus bar 18, to the top face of which is secured a front lead 20, as shown. The assembly also comprises a back lead 22 which is secured to a foil layer in the laminated assembly, so that the front lead 20 and back lead 22 when joined to a suitable source of alternating current (not shown in FIG. 1) provide electrical engergy to the conducting and semi-conducting components of the lamp assembly, including phosphor particles which under alternating current application conditions emit light energy, thereby producing the luminescence desired from the lamp article.

The lamp article shown in FIG. 1 comprises on the lit area 16 thereof an indexing indicium 24, for purposes of effecting alignment of cutting and other processing tools, in relation to the multi-layer assembly during its fabrication, and in such manner as not to adversely affect the lamp or its utility for its intended illumination purpose.

The electroluminescent lamp article in FIG. 1 is shown in relationship to a detection means, which in the embodiment shown may, for example, comprise a light source element 26 joined by lead wires 28 and 30 to a power source of suitable character (not shown). The light source element 26 impinges electromagnetic radiation of a selected wave length and frequency characteristic at the indexing indicium 24, for visualization detection thereof, so that it may be used for alignment purposes. In such embodiment, the indexing indicium 24 may suitably comprise a mark, dot, or other artifact in one of the layers of the lamp assembly. Under the impinged electromagnetic radiation from light source element 26, the indexing indicium fluoresces or otherwise exhibits a visually discernible or otherwise detectable "signature" which is usefully employed for orientational purposes, as a guide to severing or cutting means, or other processing equipment which is utilized to fabricate the final product lamp assembly.

Alternatively, the element 26 may suitably comprise a magnetic flux emitting head joined by the lead wires 28 and 30 to a source of actuating energy, with the emitted magnetic flux permitting a visual or otherwise detectable location of the indexing indicium 24.

Regardless of the specific nature and detecting technique of the indexing indicium, there is desired a localized mark, dot, region, or locus which is differentiable under detection conditions and/or with detection apparatus, from the bulk surface comprising the lit area of the electroluminescent lamp.

Thus, the indexing indicium 24 in the lamp 10 shown in FIG. 1 may be of widely varying character, and the schematically illustrated detection means comprising element 26 and lead wires 28 and 30 may comprise any suitable actuating or detection means, whereby the location of the indexing indicium can be readily and accurately perceived and utilized.

Figure 2:
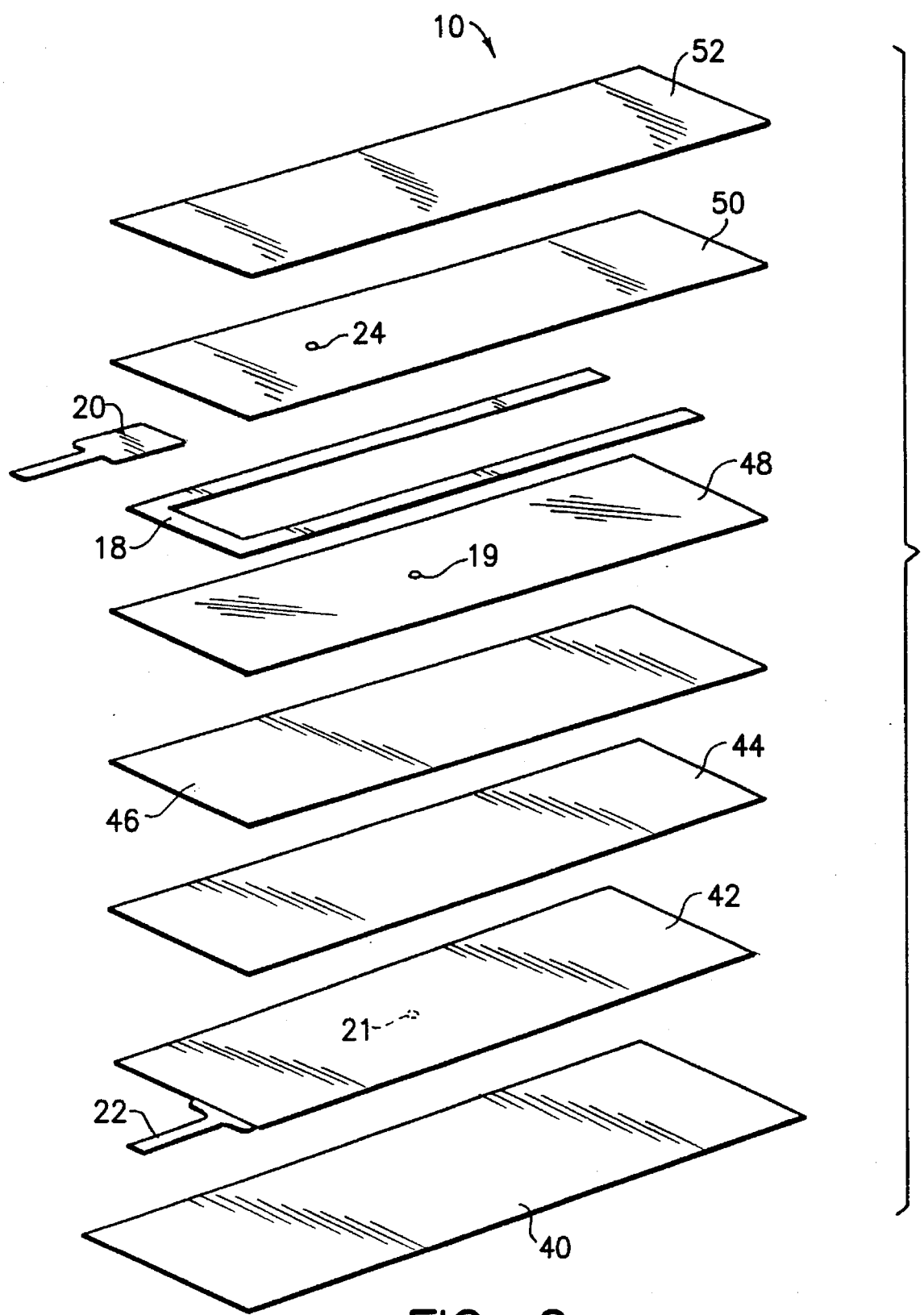
FIG. 2 is an exploded perspective view of the constituent layers and lead elements of the lamp of FIG. 1.

Referring now to FIG. 2, there is shown an exploded perspective view of the lamp article of FIG. 1 comprising the component laminae and lead elements thereof.

As shown in FIG. 2, the electroluminescent lamp 10 comprises rear lead 22, back electrode layer 42, dielectric layer 44, phosphor layer 46, transparent electrode 48, busbar 18, front lead 20, desiccant layer 50, registration mark 24 and front and back package layers 40 and 52, respectively.

In a specific embodiment of the lamp shown in FIGS. 1 and 2, the back electrode layer 42 is formed of aluminum foil having a thickness which may for example be on the order of 2 or 3 mils. Dielectric layer 44 is composed of fine particle barium titanate powder, dispersed in a suitable high dielectric resin, e.g., a polysaccharide resin or a fluorinated hydrocarbon resin of high dielectric character. Phosphor layer 46 comprises an electroluminescent powder dispersed in a high dielectric resin, which may for example comprise a resin material of the type employed in dielectric layer 44.

Transparent electrode layer 48 is made from an indium tin oxide powder or flake, dispersed into a suitable vehicle, preferably a thermoset polymer having a clear character. Bus bar 18 contains silver flake, to provide high conductivity, dispersed into a suitable vehicle, such as a thermoset polymer. Desiccant layer 50 preferably comprises a polymer that absorbs more than 10% of its weight in water and also provides a barrier to oxygen, nitrogen, and carbon dioxide.

The indexing indicium in this illustrative embodiment comprises registration mark 24 which may for example be formed as a dot or blob of the same type of polymer as utilized in desiccant layer 50, but modified to contain a dye or ink that is activated outside of the visible light range. Suitable dye or ink materials include fluoroscein, cyanin dyes, Texas Red dyes, etc.

The electroluminescent lamp package is formed by package layers 40 and 52, which are heat sealed, or otherwise bonded, to one another at their perimetral edges, so that the electroluminecent lamp thereby is retained in a package which acts as a moisture barrier for the lamp, to minimize the ingress of water vapor to the lamp and its hygroscopic electroluminescent material. The packaging layers 40 and 52 generally comprise transparent films, either monolayer or multilaminate films that provide excellent water vapor and gas barrier properties. A commonly used monolayer barrier film is polychlorotrifluoroethylene, sold by Allied Chemical Corporation under the trademark ACLAR. A multilaminate film which may be usefully employed for such purpose comprises polychlorotrifluoroethylene film laminated to a lower melt adhesive layer such as an EVA-filled polyethylene film.

As shown in FIG. 1, the registration mark 24 is located on lit surface 16 of lamp 10. The registration mark 24 in a preferred embodiment is transparent, and is not visible in the visible spectrum. Such mark may be of any suitable size, consistent with the needs of the processing steps requiring registration in the overall methodology of fabricating the electroluminescent lamp. The registration mark in such embodiment becomes detectable, and visible, when exposed to frequencies outside of the visible spectrum, such as ultraviolet or infrared light.

It is not necessary in the broad practice of the present invention that the mark 24 constituting the indexing indicium become visible when activated, provided that such mark is detectable by some means, method, physical perception, etc. Thus, the indexing indicium 24 may comprise a material in the form of a mark, dot, coating or other local deposit, which is detectible in exposure to: a specific kind of electromagnetic radiation (e.g., ultraviolet light, infrared radiation, gamma rays, etc.) of a specific character (e.g., lying in a specific frequency range, having a specific flux, etc.); a specific gas causing colorimetric or other perceptible response of the indicium; heat or thermal conditions of a specific character; a magnetic field (of a specific intensity level); a chemical reagent reactive with the indicium to provide a perceivable product (provided, however, that the reaction does not preclude the efficicacy of the lamp for its intended purpose); or any other condition or material, in the presence of which the indicium becomes available to the processing system for alignment purposes.

In respect of the illustrative embodiment shown in FIGS. 1 and 2, one preferred indexing indicium comprises a registration mark formed by depositing on the desiccant layer or other layer of element in the lit area of the lamp, a dot or blob of a formulation comprising an ultraviolet fluorescing dye activated by exposure to ultraviolet radiation having a wavelength on the order of about 365 nanometers. When the registration mark is exposed to such ultraviolet light, the registration mark becomes visible.

An ultraviolet dye of such fluorescent type is sold by Chemserve, Inc. under the tradename Fluorowhite 1500. In an illustrative composition, the registration mark ink may for example comprise 4 grams of this ultraviolet fluorescing dye dissolved in 40 grams of distilled water. Once the dye is dissolved, the water and dye mixture is added to 200 grams of a suitable desiccant ink. Suitable desiccant inks include hygroscopic polymers, such as polyvinyl alcohol, sodium polyacrylate, nylon 6,6 and other materials more fully described in U.S. Pat. No. 5,051,654, the disclosure of which hereby is incorporated herein by reference. When all of the ingredients of such dye composition have been combined, they are mixed for a minimum of two hours. The viscosity of the resulting ink can be adjusted by adding or boiling off water. For a brighter registration mark, more dye can be used, and for a duller mark, less dye can be used.

Screen printing is a preferred method for applying a registration mark 24 of the foregoing type. Since the registration mark 24 is used to achieve very rigorous tolerances, in the range of about 1 to 10 mils, it is critically important that the registration mark 24 be printed on the lit surface of the electroluminescent lamp very accurately. Screen printing of the registration mark material may be employed to achieve such rigorous tolerances, provided that high tolerance artwork, a tightly stretched screen, the proper screen printing press, and an experienced operator are involved.

With the registration mark 24 appropriately placed, the lamp assembly thereafter can be registered or aligned in the subsequent processing steps, with reference to the mark. In carrying out the subsequent processing steps, where the registration mark is formed of an ultraviolet ink composition, as described above, the mark must be exposed to an activating radiation at the appropriate frequency, such as ultraviolet or infrared light.

In a preferred embodiment, wherein the mark is uv-detectible, the activating radiation has a frequency of 365 nanometers. Since the registration mark is printed on a surface that does not fluoresce or otherwise emit a perceptible response to the activating radiation at a wavelength of 365 nanometers, a contrast is created under uv-irradiation conditions, between the mark and the surrounding lit surface of the electroluminescent lamp. Such contrast can be detected by a CCD camera, a fiber optic scanner tuned at the proper frequency, or with any other suitable means and/or method.

Once detected, the signal from the camera or scanner is sent to a motion controller or personal computer where the signal is analyzed. The motion controller or personal computer then sends the signal to a stepper motor or other similar type of motor to correct for position, until the mark is in the precise desired position relative to the camera or scanner. Usually the motors used to correct the position of the mark would be attached to an XYΘ table or a similar multi-positioning device. Once the lamp assembly is registered in the processing system, the alignment-requiring manufacturing steps are carried out, e.g., packaging, sealing and final cutting, and then the next lamp assembly is moved into position in the processing system for registration.

The provision on an electroluminescent lamp assembly of one or more registration marks according to the present invention, enables the use of process systems in which the electroluminescent lamp assembly including the registration indicia on the lit surface thereof, is readily and efficiently steel rule die cut, both in the initial foil cut and in the final cut. The registration indicia can also be used to place leads into close tolerance registration with the electroluminescent material in the lamp assembly. The registration indicium is further usefully employed, to transfer the lamp onto a web for subsequent packaging, as well as to crimp wires onto the leads in a positionally appropriate manner.

The registration mark can also be used to count the lamps in a continuous fabrication manufacturing facility, and to place completed lamps in position in an ultimate end use application.

The use of registration or indexing indicia according to the present invention provides a substantial improvement over the structure and manufacturing techniques of the prior art. As discussed earlier herein, prior art lamps have used a visible registration mark located outside of the lit area of the electroluminescent lamp. Such an "outside" registration mark cannot be used for subsequent processing once the lamp is cut and separated from the scrap (e.g., edge trim waste) of the web assembly (precursor laminate), because the registration mark is contained on and will be lost with the discarded scrap. Nonetheless, such outside registration mark can advantageously be used in the initial lay-up fabrication of the various layers making up the lamp element, with the registration mark (indexing indicium) of the present invention being added to the lit face of the lamp element before its being die cut in the manufacture of the product lamp assembly. By such expedient, the registration marking techniques of the prior art can be advantageously retained, and supplemented with the registration marking technique of the present invention, to achieve a significant advance in the art of making electroluminescent lamps.

In accordance with the present invention, the registration mark or other indexing indicium is located on the face of the lamp, within the lit area of the lamp, such that the indexing indicium remains with the lamp throughout all of its subsequent processing steps. In electroluminescent lamps of the general type shown in FIGS. 1 and 2, the lit area of the lamp is the portion of the lamp surface defined by the translucent or transparent electrode 48, except for areas covered by the bus bar 18 or the front lead tab connection of the front electrode 20. It is to be recognized that in some instances there may be multiple lighted or lit areas within a single lamp package, wherein each lamp portion of the product article utilizes a registration mark or other indexing indicium according to the present invention, or alternatively wherein only one or less than all of such lamp portions utilize such mark or indicium, with the specific number, size, and arrangement of such indicium or indicea being readily determinable, as advantageous in a specific application of the invention.

An alternative embodiment of the indexing indicium is shown in FIG. 2. The registration mark in this embodiment is created by forming a slot 19 in the electrode layer 48 so that the slot exposes phosphor layer 46. Phosphor layer 46 then will fluoresce when exposed to ultraviolet light. It is important that slot 19 be very narrow so that the edge effects of the electrode (when activated) continue to activate the portion of the phosphor layer 46 that is left exposed within slot 19.

Such technique allows for the achievement of uniform lighting on the surface of the lamp, and thus the indexing indicium does not adversely impact the lighting output or illumination efficiency of the electroluminescent lamp product article. If the exposed phosphor does not light when the lamp is activated, the indexing mark would be visible, and the illumination-generating capability of the electroluminescent lamp will be adversely affected. For such reasons, the slot in actual practice is typically not more than about 15–17 mils wide, although appropriate dimensions for such type of indicium in a specific application are readily determinable without undue experimentation by those of ordinary skill in the art.

Another alternative embodiment of the invention utilizes a magnetic ink registration mark 21 (see FIG. 2) printed on the backside of the lamp. A subsequently applied magnetic field will pass through the successive layers (laminae) of the lamp and then is detectible by appropriate magnetic field detection means such as an induction detector. In this embodiment, no activating radiation frequency is required, and the mark can be readily detected from the face of the lamp.

Yet another alternative embodiment of the indexing indicium-bearing lamp article of the present invention utilizes an infrared emitting ink which can be readily detected by an infrared detector.

While the preferred method of placing a registration mark on the lit surface of an electroluminescent lamp in the practice of the present invention is screen printing, a wide variety of alternative registration mark application methods may also be used. For example, the registration mark may be stamped into place, flexographically printed into place, or deposited, imprinted, embossed, or applied by any other suitable means and/or method.

Similarly, while the presently preferred registration mark comprises an ultraviolet fluorescing dye, it will be apparent that any suitable type of ink, paint, dye, coating or composition may be used to define one or more registration marks on the face of the lamp, within the lit area thereof. For example, a clear coat acrylic ink loaded with an ultraviolet fluorescing dye may be used.

The important functional requirements of the registration mark in the broad practice of the present invention are that the mark (1) is transparent and invisible on the lit surface of the lamp while exposed to the visible light spectrum or otherwise does not affect the light uniformity of the lamp, (2) is located within the border of the lit surface of the lamp, and (3) can be positionally detected by some means and/or method.

Although the invention has been described hereinabove in respect of electroluminescent lamp applications of the invention, it will be apparent that the utility of the present invention is not thus limited, and that the invention also has practical application and utility in the manufacture and use of other light source articles, particularly light source articles of a generally planar conformation, such as cold cathode displays, plasma displays, light emitting diode displays, and liquid crystal displays.

While the invention has been described in detail, and with reference to specific embodiments thereof, it will be apparent to those of ordinary skill in the art that variations and modifications can be made therein without departing from the spirit and scope of the present invention, and all such modifications and variations are therefore to be considered as being within the spirit and scope of the present invention as claimed.

What is claimed is:

1. An electroluminescent lamp including an electroluminescent material defining a lit area of the lamp when an excitatory electrical field is applied to the electroluminescent material, and having an indexing indicium located on or within the lit area of the lamp, wherein the indexing indicium (I) is not visible when light is emitted from the lit area of the lamp in the operation thereof involving application of said excitatory electrical field to the electroluminescent material, but (II) is detectable when the indexing indicium is exposed to a detection condition therefor.

2. An electroluminescent lamp according to claim 1, wherein the detection condition comprises a condition selected from the group consisting of:
   (a) exposure of the indexing indicium to electromagnetic radiation producing a perceivable response thereto from the indicium;
   (b) exposure of the indexing indicium to magnetic field conditions producing a perceivable response thereto from the indicium; and
   (c) exposure of the indexing indicium to a chemical reactant under conditions producing a perceivable response thereto from the indicium.

3. An electroluminescent lamp according to claim 1, wherein the perceivable response is physically perceivable through at least one of the physical senses of a human being.

4. An electroluminescent lamp according to claim 1, wherein the perceivable response is perceivable with a detection apparatus.

5. An electroluminescent lamp according to claim 1, wherein the electroluminescent material comprises a phosphor luminescent material.

6. An electroluminescent lamp according to claim 1, wherein the electroluminscent lamp comprises a multilaminate structure including:
   (a) a back electrode layer;
   (b) a dielectric layer;
   (c) a phosphor layer;
   (d) a transparent electrode layer;
   (e) a bus bar member; and
   (f) a desiccant layer.

7. An electroluminescent lamp according to claim 6, wherein said multilaminate structure is packaged in a package comprising transparent moisture barrier layers sealed at their outer margins to one another to form the package enclosing the lamp.

8. An electroluminescent lamp according to claim 1, wherein the indexing indicium comprises a magnetic character which is perceivable in the presence of an applied magnetic field.

9. An electroluminescent lamp according to claim 1, wherein the indexing indicium of the lamp is constructed and arranged so that it does not adversely affect the uniformity of the illumination supplied by the electroluminescent lamp in use.

10. An electroluminescent lamp according to claim 1, wherein the indexing indicium is selectively visualizable under exposure to radiation selected from the group consisting of fluorescent light, ultraviolet radiation, and infrared radiation.

11. An electroluminescent lamp according to claim 1, wherein the indexing indicium of the lamp comprises a surface artifact on the lit surface of the lamp article which is responsive to an applied stimulus, and yields a sensible physical response thereto for demarcating the relative position of the indexing artifact.

12. An electroluminescent lamp including an electroluminescent material defining a lit area of the lamp when an excitatory electrical field is applied to the electroluminescent material, and having at least one registration mark located in the lit area of the lamp, wherein the indexing indicium is non-apparent in visible light, but is detectable when exposed to a detection condition selected from the group consisting of (I) impingement on the indexing indicium of a flux of radiation other than visible light radiation, and (II) application of a magnetic field to the indexing indicuium.

13. An electroluminescent lamp according to claim 12, wherein the indexing indicium comprises a mark on the lamp printed on or within the lit surface of the lamp.

14. An electroluminescent lamp assembly comprising an electrode overlying a phosphor layer connectible to an electrical field supply for exciting the phosphor layer and generating visible light illumination, with an opening in the electrode exposing the phosphor layer so that the phosphor layer fluoresces when it is exposed to ultraviolet light, and wherein the opening is constructed and arranged so that the electrode has sufficient edge effect to charge the exposed phosphor so that it can be energized and resultingly emit light.

15. An electroluminescent lamp assembly according to claim 14, wherein the electrode opening has a transverse opening dimension not exceeding about 20 mils.

16. A light source article including an illumination element defining a lit area of the light source article, and having an indexing indicium located on or within the lit area of the light source article, wherein the indexing indicium (I) is not visible when light is emitted from the lit area of the light source article in the operation thereof, but (II) is detectable when the indexing indicium is exposed to a detection condition therefor.

17. A light source article according to claim 16, of generally planar conformation.

18. In a method of making an electroluminescent lamp which is registerable for packaging in an outer casing, including the steps of:

(a) providing a thin film metal substrate;

(b) coating the thin film metal substrate with an insulating layer of high dielectric constant material, (c) forming on the insulating layer of high dielectric constant material a coating of a resin containing electroluminescent phosphor defining a lit area of the electroluminescent lamp;

(d) forming a transparent electrode layer on the coating of electroluminescent phosphor-containing resin;

(e) depositing on the transparent electrode layer a bus bar for tranferring current to the transparent electrode layer;

(f) applying a desiccant layer over the transparent electrode layer and busbar, to yield a coated laminate assembly; and (g) disposing the lamp in said outer casing to form a packaged assembly and cutting the packaged assembly to a predetermined shape in relation to said lit area defined by said coating of a resin containing electroluminescent phosphor, the improvement comprising providing an indexing indicium on or within the lit area of the electroluminescent lamp for registration in said step (g).

* * * * *